(12) United States Patent
Pulnikov et al.

(10) Patent No.: US 11,098,728 B2
(45) Date of Patent: Aug. 24, 2021

(54) IMPELLER AND METHOD FOR PRODUCING SUCH AN IMPELLER

(71) Applicant: ATLAS COPCO AIRPOWER, NAAMLOZE VENNOOTSCHAP, Wilrijk (BE)

(72) Inventors: Aleksandr Pulnikov, Wilrijk (BE); Edwin Emiel Roskam, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 425 days.

(21) Appl. No.: 15/549,482

(22) PCT Filed: Feb. 1, 2016

(86) PCT No.: PCT/BE2016/000007
§ 371 (c)(1),
(2) Date: Aug. 8, 2017

(87) PCT Pub. No.: WO2016/127225
PCT Pub. Date: Aug. 18, 2016

(65) Prior Publication Data
US 2018/0051709 A1    Feb. 22, 2018

Related U.S. Application Data

(60) Provisional application No. 62/113,580, filed on Feb. 9, 2015.

(30) Foreign Application Priority Data

Mar. 3, 2015    (BE) .................................. 2015/0095

(51) Int. Cl.
   B63H 1/16    (2006.01)
   F04D 29/28   (2006.01)
   (Continued)

(52) U.S. Cl.
   CPC ............ *F04D 29/284* (2013.01); *B22F 5/009* (2013.01); *B22F 10/20* (2021.01); *B28B 1/001* (2013.01);
   (Continued)

(58) Field of Classification Search
   CPC .... F04D 29/284; F04D 29/053; F04D 29/266; F04D 29/30; B33Y 10/00; B33Y 80/00;
   (Continued)

(56) References Cited

U.S. PATENT DOCUMENTS 958,129 A *  5/1910  Huguenin ............. F04D 29/284
                                                        415/182.1
3,305,166 A *  2/1967  Castle ................... F04D 29/285
                                                        415/198.1
(Continued)

FOREIGN PATENT DOCUMENTS

DE      856246     *  11/1952  ........... F04D 29/284
DE      856246  C    11/1952
WO   2013124314 A1   8/2013

OTHER PUBLICATIONS

Belgian Search Report From BE Application No. BE201500095, dated Jan. 15, 2016.
(Continued)

*Primary Examiner* — Hung Q Nguyen
*Assistant Examiner* — Anthony Donald Taylor, Jr.
(74) *Attorney, Agent, or Firm* — Workman Nydegger

(57) ABSTRACT

An impeller includes a central, shaft or a tube for mounting on a shaft, a hollow hub is located around the shaft or tube, and a series of blades are attached to the outside of the hub by their bases. A reinforcing rib is provided for each blade, and extends on the shaft or tube in a radial direction and
(Continued)

forms a facial connection between the shaft or tube and the inside of the hub at a position opposite the attachment of the base of a blade concerned.

20 Claims, 5 Drawing Sheets

(51) Int. Cl.
| | | |
|---|---|---|
| B22F 5/00 | (2006.01) | |
| F04D 29/02 | (2006.01) | |
| B22F 10/20 | (2021.01) | |
| B33Y 10/00 | (2015.01) | |
| B33Y 80/00 | (2015.01) | |
| B29C 64/153 | (2017.01) | |
| B28B 1/00 | (2006.01) | |
| F04D 29/053 | (2006.01) | |
| F04D 29/26 | (2006.01) | |
| F04D 29/30 | (2006.01) | |
| B29L 31/00 | (2006.01) | |

(52) U.S. Cl.
CPC ............ *B29C 64/153* (2017.08); *B33Y 10/00* (2014.12); *B33Y 80/00* (2014.12); *F04D 29/023* (2013.01); *F04D 29/053* (2013.01); *F04D 29/266* (2013.01); *F04D 29/30* (2013.01); *B22F 2005/004* (2013.01); *B29L 2031/7504* (2013.01); *F05D 2230/22* (2013.01); *F05D 2230/31* (2013.01); *Y02P 10/25* (2015.11)

(58) Field of Classification Search
CPC ...... B29C 64/153; B22F 3/1055; B22F 5/009; B28B 1/001; B29L 2031/7504
USPC .......................................................... 416/186
See application file for complete search history.

(56) References Cited

U.S. PATENT DOCUMENTS

| | | | | |
|---|---|---|---|---|
| 4,060,337 | A | * | 11/1977 | Bell, III ................ F04D 29/284 416/186 R |
| 5,108,261 | A | * | 4/1992 | Ress, Jr. ................... F01D 5/14 416/190 |
| 7,281,901 | B2 | | 10/2007 | Garman et al. |
| 2006/0140767 | A1 | * | 6/2006 | Garman ................. B22F 5/085 416/182 |
| 2013/0001837 | A1 | * | 1/2013 | Gohler .................. B22F 3/1055 264/497 |
| 2015/0017013 | A1 | * | 1/2015 | Tozzi .................... F04D 29/023 416/227 R |

OTHER PUBLICATIONS

International Search Report From PCT Application No. PCT/BE2016/000007, dated Jul. 22, 2016.

* cited by examiner

IMPELLER AND METHOD FOR PRODUCING SUCH AN IMPELLER

BACKGROUND

The present invention relates to an impeller, for example an impeller for a centrifugal machine such as a turbocompressor, turbine or similar.

As is known, a centrifugal compressor element as used in turbocompressors consists of an impeller that is rotatably affixed in a housing with an axial inlet and a radial outlet, whereby the impeller is formed by a type of solid trumpet-shaped hub to bend the gas drawn in at the inlet from the axial direction to the radial direction at the outlet, and by blades that are affixed on the hub and which together with the hub and the housing define narrowing channels through which the gas is guided to compress it.

The impeller is provided with a central borehole to be able to attach the impeller to a drive shaft.

It is known that such an impeller is driven at high speeds of many tens of thousands of revolutions per minute whereby the linear peripheral velocity at the outlet of the impeller can reach some hundreds of metres per second.

Due to the large centrifugal forces that occur at such high speeds, very large stresses are generated in the material of the impeller.

However, these stresses in an impeller with a completely solid hub are distributed very unevenly with peaks at the location of the central borehole and in the axial direction close to the back of the hub, i.e. at the end of the hub with the largest diameter.

Depending on the geometry of the impeller the stress gradient can vary, but the largest section of the impeller is underloaded, with stresses that are far below the elastic limit of the material from which the impeller is made, with the disadvantage of the inefficient use of this material and an unnecessarily high mass of the impeller.

The reduction of the mass of the impeller is nevertheless important to keep the natural bending frequency of the drive shaft, on which the impeller is affixed, sufficiently high to enable higher speeds of the impeller, which is useful in itself for an energy-efficient operation of a turbocompressor.

With a lower mass of the impeller the bearings of the drive shaft are less loaded, such that to design a turbocompressor it can be chosen to use smaller bearings resulting in a lower cost price and/or a more compact compressor element or a drive shaft of a smaller diameter.

WO 2013/124314 proposes reducing the mass of the impeller by applying a metal grid structure in a central section of the hub of the impeller.

However, such a grid structure as proposed in WO 2013/124314 is not optimum to accommodate radially oriented centrifugal forces, whereby the grid structure is unnecessarily strong and rigid in unloaded directions, which results in a certain weight disadvantage.

U.S. Pat. No. 7,281,901 describes a structure for an impeller with a hollow hub with internal reinforcements that are primarily oriented to reduce the inertia, but the presented solutions are insufficient to bring about a uniform distribution of the stresses in the impeller.

Such a uniform stress distribution could only be achieved with the solution of U.S. Pat. No. 7,281,901 by a carefully balanced dimensioning of the different zones of the impeller. However, no guidelines are given in U.S. Pat. No. 7,281,901 to realise such a balance.

Indeed, the internal reinforcements as presented in U.S. Pat. No. 7,281,901 do not take account of the geometry of the blades, which leads to stress concentrations occurring in the hub of the impeller. In order to be able to accommodate these stress concentrations the hub must be made thicker, which leads to increased stresses in other zones of the impeller.

There is consequently still a need for an impeller structure with a better utilisation of the material and consequently with a lower mass.

SUMMARY

The purpose of the present invention is to provide a solution to one or more of the aforementioned and other disadvantages relating to known impeller designs, as described in the above-mentioned WO 2013/124314 and U.S. Pat. No. 7,281,901.

To this end the invention concerns an impeller, comprising:
a central shaft or a tube for mounting on a shaft;
around the shaft, a hollow hub with an outside and an inside oriented towards the shaft or tube;
a series of blades that are attached to the outside of the hub by their bases,
whereby for each blade, or for at least a number of these blades, a reinforcing rib is provided that extends on the shaft or tube in a radial direction and forms a radial connection between the shaft or tube and the inside of the hub at a position opposite the attachment of the base of a blade concerned.

Reinforcing ribs are thus provided that extend as radial spokes, so to speak, in line with the blades and due to their radial orientation accommodate the radial centrifugal forces that are exerted on the hub by the blades via the base of the blades.

This helps relieve the hub in the direction of the centrifugal forces that constitute the main load of the hub, whereby the entire mass of these reinforcing ribs is utilised to allow the stresses in the hub to flow away to the shaft or tube of the impeller without dead mass being present in the hub that does not contribute to the strength of the impeller.

Preferably a reinforcing rib is provided for each blade.

This helps distribute the stresses in the hub due to the centrifugal forces in a very uniform way over the material of the hub.

Preferably the location of attachment of the head of the reinforcing ribs on the inside of the hub is situated within the footprint of a corresponding blade on this inside.

The positive effect of the reinforcing ribs on the uniform distribution of the stresses is a maximum when the aforementioned location of attachment of the reinforcing ribs within the footprint of a corresponding blade is shifted slightly sideways with respect to the centreline of this footprint, preferably in a direction against the direction of rotation for which the impeller is intended.

An even more uniform stress distribution can be obtained by allowing the thickness of the material to vary in certain ways, for example in the hub, the back wall, the shaft or tube and/or in the reinforcing ribs.

In particular the invention applies to an impeller of the centrifugal type.

The invention also applies to an impeller of the closed type whereby the blades are not only attached to the hub, but whereby a shroud is provided around the blades that also connects the blades together at their tops.

The present invention also relates to a method for producing an impeller, whereby this method comprises the following steps:

the provision of a shaft or tube;
the provision of a back wall on the shaft or tube;
the provision of a hollow hub with blades on the outside of this hub;
the provision of a reinforcing rib for each blade or for at least a number of these blades, whereby these reinforcing ribs on the shaft or tube extend in a radial direction and form a radial connection between the shaft or tube and the inside of the hub at a place opposite the attachment of the base of a blade concerned.

BRIEF DESCRIPTION OF THE DRAWINGS

With the intention of better showing the characteristics of the invention, a preferred embodiment of an impeller according to the invention and a method for producing such an impeller are described hereinafter by way of an example, without any limiting nature, with reference to the accompanying drawings, wherein.

DETAILED DESCRIPTION OF VARIOUS EMBODIMENTS

Figure 1:
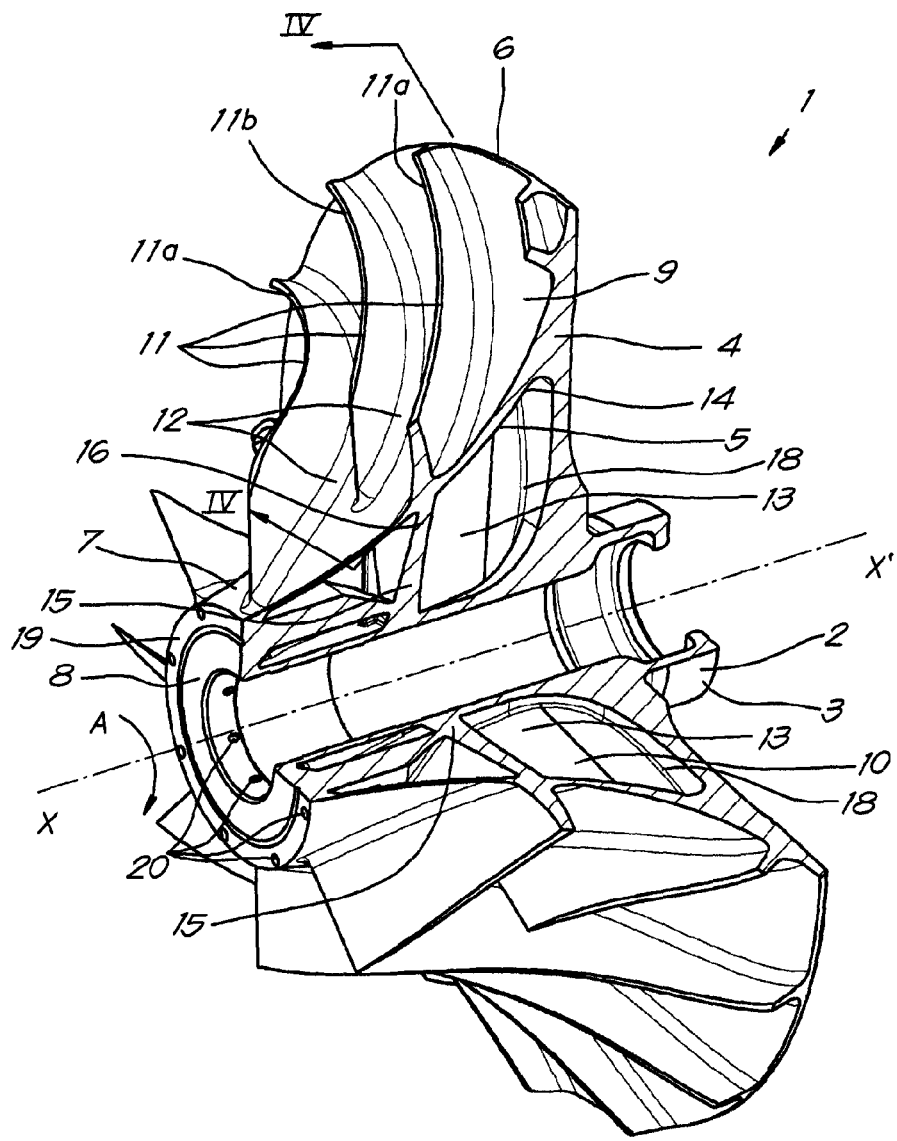
FIG. 1 schematically shows a perspective view of an impeller according to the invention, with partial omission of a sector.
Figure 2:
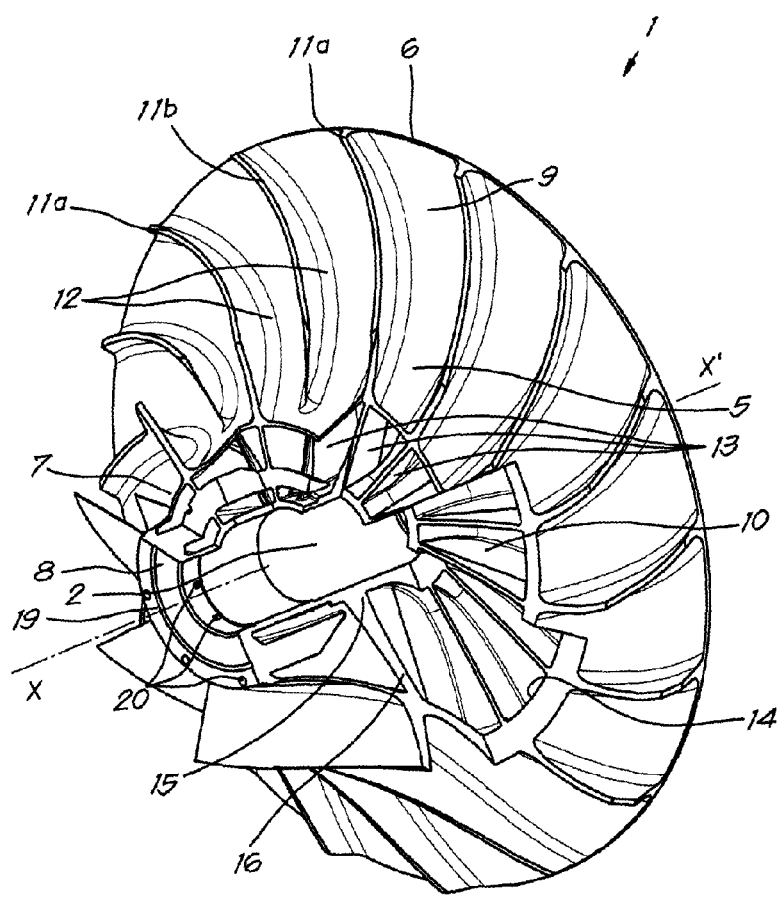
FIG. 2 shows another perspective view of the impeller of FIG. 1, but with a stepped omission of a sector.
Figure 3:
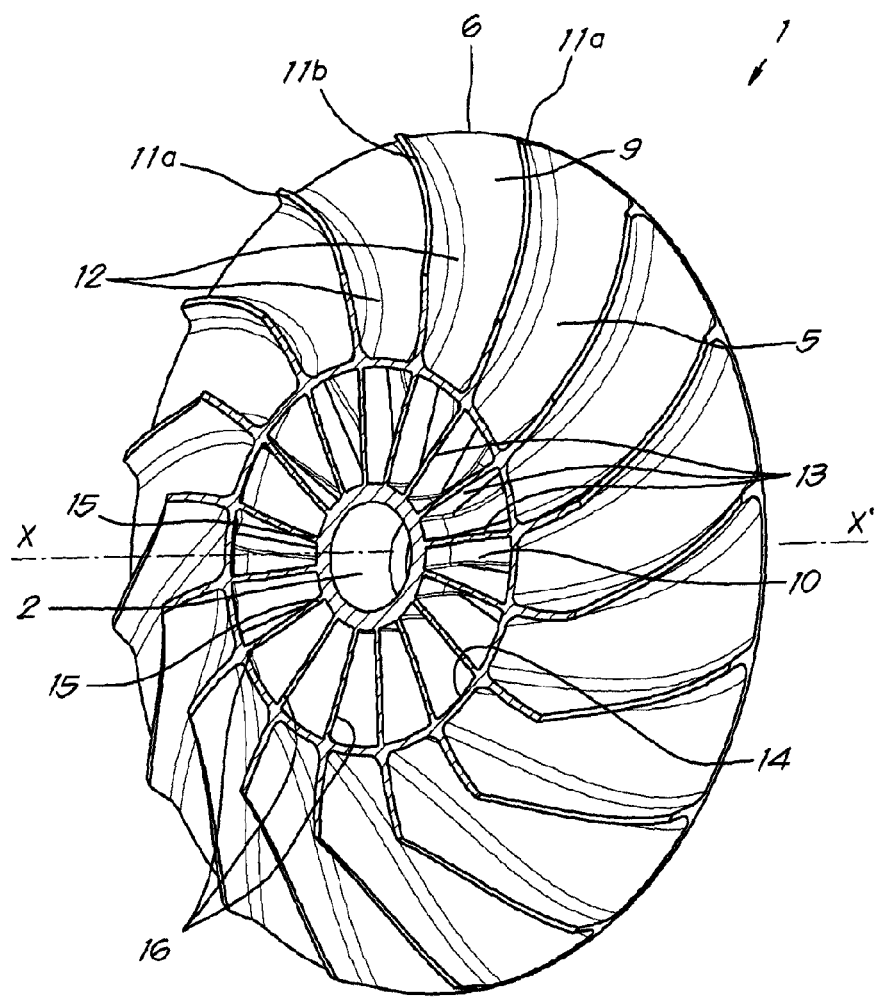
FIG. 3 shows another perspective view of a truncated section of an impeller according to the invention.

The impeller 1 shown in FIGS. 1 to 3 is an impeller of a centrifugal compressor element by way of an example.

The impeller 1 comprises a central tube 2 with which the impeller 1 can be mounted on a shaft, not shown in the drawings, in order to be driven around the geometric centreline X-X' of the tube in the housing of the compressor element.

A radially extending back wall 4 is provided on the tube 2 close to one end 3, that in the case of the example shown is essentially disc shaped.

On one side of the back wall 4 the impeller 1 comprises a hollow trumpet-shaped hub 5 extending around the tube 2, that connects to the back wall 4 by its end 6 with the largest diameter, and connects to the other end 8 of the tube 2 by its other end 7 with the smallest diameter.

The outside surface 9 of the hub 5 changes in a sloping way from an essentially axial direction X-X' at the end 7 to an essentially radial direction at the end 6.

A hollow space 10 is enclosed between the hub 5, the tube 2 and the back wall 4.

In a known way the hub 5 is provided with a series of curved blades 11 that are attached by their bases 12 to the hub 5.

In the example shown, two series of blades are provided, i.e. main blades 11a on the one hand, that extend over a certain length from the axially oriented end 7 of the hub 5 to the radially oriented end 6 of the hub 5, and 'splitter blades' 11b on the other hand, that extend between the main blades 11a over a shorter length, starting at an axial distance from the end 7 of the hub 5 to the end 6 of the hub 5.

However, the invention is not limited to two series of blades 11, but is also applicable to any number of series of blades 11, whereby for example no splitter blades 11b are present or on the contrary a number of series of splitter blades 11b can be provided.

According to the invention, in the hollow space 10 of the hub 5 reinforcing ribs 13 are provided, of which the number is preferably equal to the number of blades 11, whereby a reinforcing rib 13 is provided for each blade 11 that extends in a radial direction with respect to the tube 2 in line with the base 12 of the blade 11 concerned.

Figure 4:
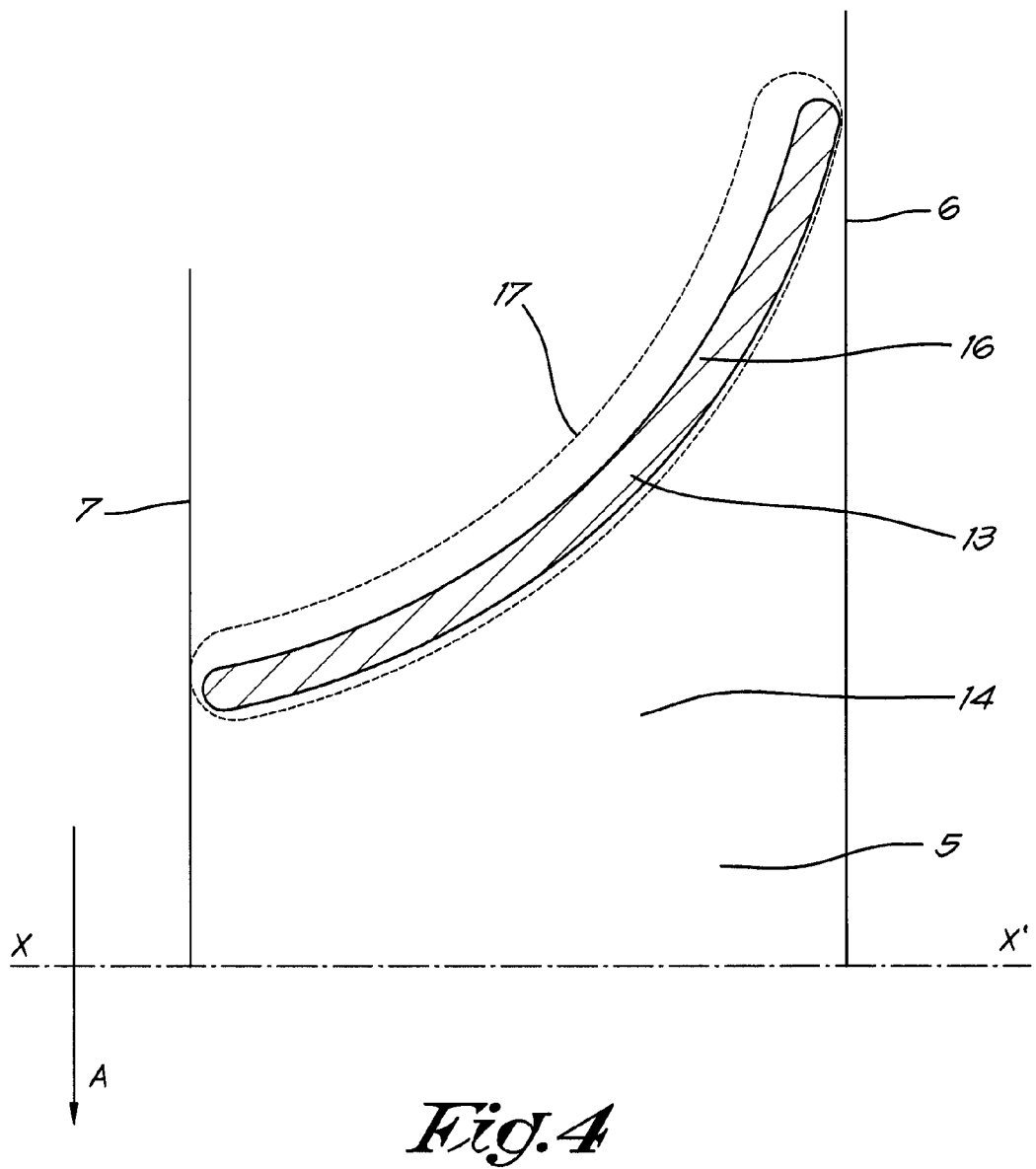
FIG. 4 shows a cross-section along the curved line IV-IV in FIG. 1.

The reinforcing ribs 13 form a connection between the inside 14 of the hub 5 and the tube 2, whereby the reinforcing ribs 13 are connected by their bases 15 to the tube 2 and connected by their heads 16 to the inside of the hub 5 at a place opposite the attachment of the base 12 of a corresponding blade 11, more specifically within the outline of the footprint 17 of a corresponding blade 11 on the inside 14 of the hub 5 and over substantially the entire length of this footprint, as shown in the cross-section along the head 16 of a reinforcing rib 13 in FIG. 4.

Preferably the aforementioned location of attachment of the heads 16 of the reinforcing ribs 13 within the footprint 17 of a corresponding blade 11 is shifted slightly sideways with the direction of rotation A for which the impeller is intended, as shown in FIG. 4.

The reinforcing ribs 13 are preferably also connected to the back wall 4 along an edge 18 over their height.

As the reinforcing ribs 13 are radially oriented, they are aligned with the centrifugal forces that occur and they limit the deformations of the hub 5 in the radial direction.

The reinforcing ribs 13 are primarily under a tensile load, whereby the entire mass of the reinforcing ribs 13 is used to divert a part of the stresses from the hub 5 to the tube 52 and also to the back wall 4 if necessary, and there is thus no, or practically no, dead mass, in other words unloaded mass, in the hollow space 10 of the hub 5 that does not contribute to the strength of the impeller in the radial direction.

The foregoing does not in any way presume that the thickness of the reinforcing ribs 13 must correspond to the thickness of the blades 11. In reality the thickness of the reinforcing ribs 13 can vary over the length and height of the reinforcing ribs 13, given that in zones at a greater radial distance from the tube 2 the hub 5 is exposed to greater centrifugal forces than in zones at a shorter distance, and as a result these zones are subject to greater deformations and stresses.

Through a suitable choice of thickness gradient it is possible to obtain a practically uniform stress distribution in the impeller 1.

Preferably the thickness of the hub 5 increases in the axial direction from the end 7 with the smallest diameter to the end 6 with the largest diameter, and has a thickening at the level of the connection to the back wall 4.

Preferably the thickness of the back wall 4 increases in the radial direction towards the connection with the tube 2.

The thickness of the reinforcing ribs preferably increases towards the connection with the back wall 4 and/or towards the connection with the tube 2.

The connections between the reinforcing ribs 13 and the rest of the impeller 1 are preferably rounded to prevent stress concentrations.

It should be noted that the aforementioned thickness gradients of the hub 5, of the back wall 4, of the tube 2 and of the reinforcing ribs 13 do not necessarily have to be applied together, but each can also be applied separately or in combination to an impeller 1.

In the event of a small number of blades 11 it is not excluded providing interjacent reinforcing ribs, not shown in the drawings, between the reinforcing ribs 13 that extend radially in line with the blades 11.

As a result the hub can be made thinner than without these interjacent reinforcing ribs.

The thickness of the interjacent reinforcing ribs can be different to the thickness of the reinforcing ribs 13 in line with the blades 11.

The number of reinforcing ribs 13 is preferably a whole multiple of the number of blades 11.

As shown in FIGS. 1 and 2 the impeller 1 can be provided with a solid ring 19 at the end 7 of the hub 5 to be able to balance the impeller 1 by locally removing material from the ring 19, for example by drilling holes.

An impeller according to the invention as described above is preferably produced by applying an additive production method whereby materials are joined together to make objects on the basis of a digital 3D model, whereby the object is generally built-up layer by layer, which is in contrast to the subtractive production methods with the removal of material as described in the standard ASTM F2792-12a.

Additive production refers to a category of production methods, for example powder bed fusion whereby thermal energy is utilised to selectively enable certain regions in a powder bed to fuse together, or by direct energy deposition whereby beamed thermal energy is used to let materials melt while they are deposited.

Within the category of powder bed fusion there are a number of technologies such as electron beam melting, whereby powder material is melted by using an electron beam; selective laser melting whereby powder material is melted by means of a laser, selective laser sintering whereby powder material is sintered by using a laser. The category of direct energy deposition includes the technology of laser cladding.

For the production of an impeller according to the invention, a metal or ceramic material, or a polymer or a fibre-reinforced polymer or any combination of these materials can be used.

The method according to the invention can comprise the step of providing holes 20 in the tube 2 that form a connection between the hollow space 10 of the hub 5 and the surroundings with the aim of being able to evacuate surplus non-molten powder from the space 10.

The holes 20 are preferably provided at the front end 8 of the tube 2, in other words at the end 8 that is furthest away from the back wall 4.

After removing the surplus powder or other material, these holes can be sealed.

In the event of the removal of powder not being required, for example in the event of laser cladding, the holes 20 in the tube 2 can be omitted.

Figure 5:
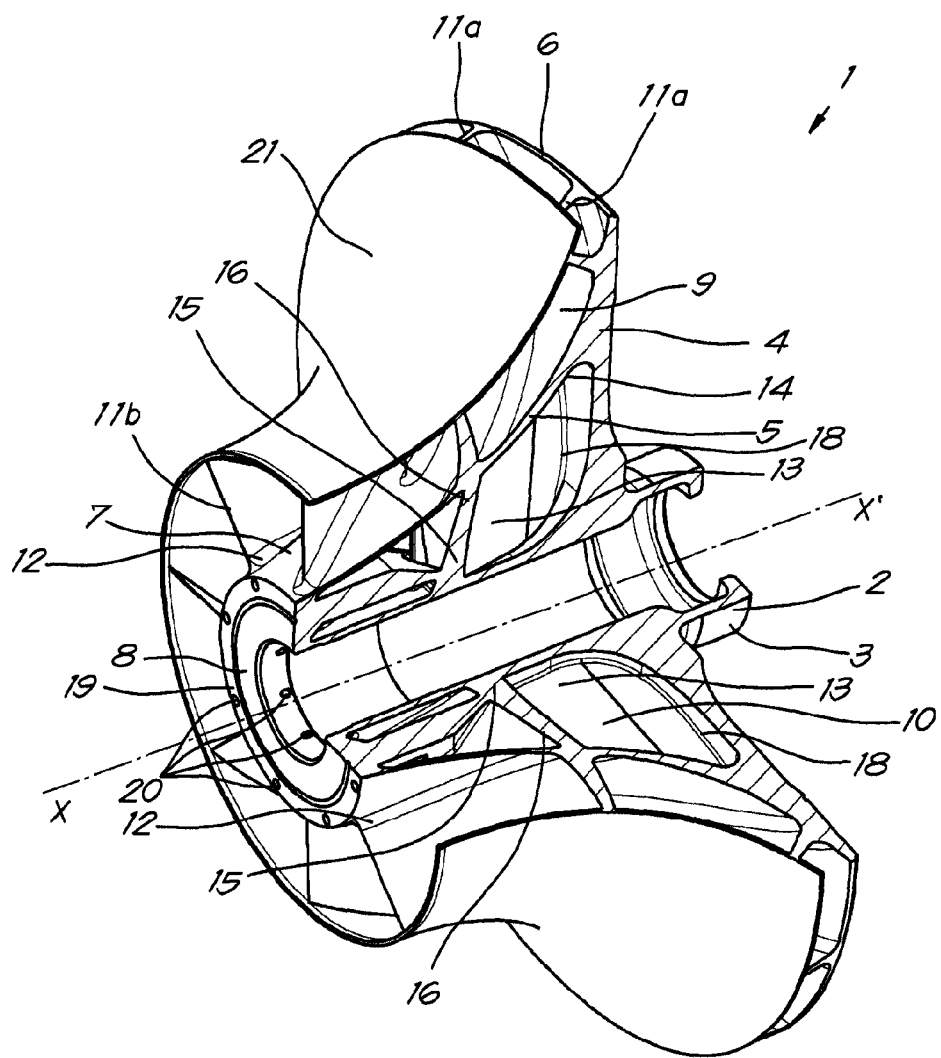
FIG. 5 shows a variant of an impeller according to FIG. 1.

The type of reinforcing ribs 13 presented is also applicable to an impeller 1 whereby a shroud 21 is provided around the hub 5 with blades 11 that connects the blades 11 together at their tops, as shown in FIG. 5.

It is clear that instead of a tube 2, a solid shaft can also be used, provided with holes or otherwise for removing powder from the space 10.

The present invention is by no means limited to the embodiment of an impeller described as an example and shown in the drawings, but such an impeller and a method for producing such an impeller can be realised according to different variants without departing from the scope of the invention.

The invention claimed is:

1. An impeller comprising:
   a central shaft or a central tube for mounting on the central shaft;
   a hub provided around the central shaft or the central tube, the hub having a hollow space with an outside and an inside, with the inside of the hub being oriented towards the central shaft or the central tube;
   a series of blades that are attached to the outside of the hub by respective bases of each of the blades,
   wherein for each of the blades, or at least some of the blades, a reinforcing rib is provided that extends from the central shaft or the central tube in a radial direction and forms a radial connection between the central shaft or the central tube and the inside of the hub at a position opposite to an attachment of the base of the blade,
   wherein each of the reinforcing ribs respectively include a head at a location of attachment of the reinforcing rib on the inside of the hub, and the respective bases of each of the blades include a footprint, the footprint being defined by an area at a location of attachment of the base of the blade to the outside of the hub, and the head at the location of attachment of the reinforcing rib on the inside of the hub is located within the footprint, and
   wherein a center line of the head at the location of attachment of the reinforcing rib on the inside of the hub for each of the reinforcing ribs is shifted within the footprint such that the center line of the head at the location of attachment of the reinforcing rib on the inside of the hub for each of the reinforcing ribs is offset from a center line of the footprint.

2. The impeller according to claim 1, wherein for each of the blades, the reinforcing rib is provided.

3. The impeller according to claim 1, wherein each of the reinforcing ribs extends over an entire length of the respective base of the corresponding blade.

4. The impeller according to claim 1, wherein the location of attachment of the reinforcing ribs located within the footprint is shifted in a direction of rotation of the impeller.

5. The impeller according to claim 1, wherein the impeller is a centrifugal impeller whose hub increases in diameter in an axial direction from a first end to a second end, wherein a back wall is provided at the second end, the back wall having a surface transverse to the central shaft or the central tube such that the back wall at least partially closes off the hollow space of the hub, and wherein each of the reinforcing ribs are directly connected to the back wall.

6. The impeller according to claim 5, wherein a thickness of the back wall increases in the radial direction towards the central shaft or the central tube.

7. The impeller according to claim 5, wherein a thickness of the hub increases in the axial direction towards the back wall.

8. The impeller according to claim 5, wherein a thickness of each of the reinforcing ribs increases towards the connection to the back wall.

9. The impeller according to claim 1, wherein the central shaft or the central tube is provided with holes that form a connection between the hollow space of the hub and a surrounding of the impeller.

10. The impeller according to claim 9, wherein the holes in the central shaft or the central tube are sealed.

11. The impeller according to claim 1, wherein a shroud is provided around the hub, the shroud connecting the blades together at heads of the blades.

12. The impeller according to claim 1, wherein attaching portions provided between the reinforcing ribs and a remaining portion of the impeller are rounded.

13. A method for producing an impeller, the method comprising:
providing a central shaft or a central tube;
providing a back wall on the central shaft or the central tube;
providing a hub having a hollow space with blades attached to an outside of the hub by respective bases of each of the blades;
providing a reinforcing rib on the central shaft or the central tube for each blade or for at least a number of the blades, wherein the reinforcing ribs on the central shaft or the central tube extend in a radial direction and form a radial connection between the central shaft or the central tube and an inside of the hub at a place opposite to an attachment of the base of the corresponding blade,
wherein each of the reinforcing ribs is provided such that the reinforcing rib includes a head at a location of attachment of the reinforcing rib on the inside of the hub, and the respective bases of each of the blades include footprint, the footprint being defined by an area at a location of attachment of the base of the blade to the outside of the hub, and the head at the location of attachment of the reinforcing rib on the inside of the hub is located within the footprint, and
a center line of the head at the location of attachment of the reinforcing rib on the inside of the hub for each of the reinforcing ribs is shifted within the footprint such that the center line of the head at the location of attachment of the reinforcing rib on the inside of the hub for each of the reinforcing ribs is offset from a center line of the footprint.

14. The A method according to claim 13, wherein steps of the method are implemented by means of an additive production method.

15. The A method according to claim 14, wherein the steps of the method comprises fusing powder material by laser or by focusing an electron beam.

16. The method according to claim 15, wherein the fusion of the powder material comprises at least partly melting or sintering the powder material.

17. The impeller according to claim 1, wherein the location of attachment of the reinforcing ribs located within the footprint is shifted slightly sideways with respect to the center line of the footprint of the corresponding blade in a direction against a direction of rotation of the impeller.

18. The impeller according to claim 1, wherein a thickness of the reinforcing ribs increases towards the central shaft or the central tube.

19. The impeller according to claim 1, wherein a thickness of each of the reinforcing ribs is provided as a thickness gradient such that a uniform stress distribution in the impeller is obtained.

20. The impeller according to claim 1, further comprising a solid ring at an end of the hub where the impeller is balanced by local removal of material from the solid ring.

* * * * *